United States Patent Office 3,609,856
Patented Oct. 5, 1971

3,609,856
BRAZING CARBON BODIES TO OTHER BODIES OF TEMPERATURE RESISTANT MATERIALS
Georg T. K. Eckert, Munich, Germany, assignor to Siemens Aktiengesellschaft, Berlin and Munich, Germany
No Drawing. Filed July 22, 1968, Ser. No. 746,244
Claims priority, application Germany, July 25, 1967, S 110,994
Int. Cl. B23k 31/02
U.S. Cl. 29—473.1          11 Claims

ABSTRACT OF THE DISCLOSURE

Brazing compositions and methods of utilizing the same to produce intimate vacuum-tight connections between carbon bodies and other bodies of temperature-resistant materials, such as high melting metals, ceramics, quartz or carbon. The brazing compositions are metal borides per se, eutectic metal boride systems per se, mixtures thereof and mixtures thereof with metal carbides, such as molybdenum carbides. The metal borides are selected from the group consisting of borides of Ni, Fe, Co, V, Cr, Mo, Nb, Ta, Zr, Pd, Pt, and mixtures thereof. The methods include applying, as by spraying, immersion, or chemical reductive deposition, the brazing composition as a liquid phase onto the body surfaces to be joined and briefly heating the brazing composition thereat to a temperature slightly higher than the melting point of the brazing composition in a non-oxidizing atmosphere. The methods also include utilizing elementary boron particles intermixed with various metal particles in an organic suspension as the brazing composition and also includes utilizing the instant brazing compositions as support base for conventional brazing filler metals.

The invention relates to brazing compositions and methods of utilizing the same and more particularly to brazing compositions and methods of utilizing the same to form vacuum-tight bonds between carbon bodies and bodies of other temperature-resistant materials.

Heretofore, carbon has not been extensively used as a suitable material in electronic tube construction even though carbon has favorable properties for such application. For example, carbon has a low specific gravity, excellent heat radiating capacity, low secondary and thermal electron emission, etc. One of the more important reasons why carbon has not been used as a material in the construction of electronic tubes is because of the general thinking in the art that carbon does not form vacuum-tight bonds with other electronic tube materials, such as metals, ceramics or glass. Consequently, no vacuum-tight bonds or connections between carbon and other electronic tube materials are known to the prior art.

Only recently, vacuum-tight types of carbons, such as glass carbon, pyrolytic carbon and pyrolytically coated carbon have become available and the tendency toward utilizing carbon bodies in the production of electronic tubes has increased more and more. Workers in the art have realized that electronic tubes having a high thermal load carrying ability are preferably composed of carbon. However, the utilization of carbon in such electronic tubes results in the necessity of joining the carbon bodies with other parts of a tube, which are generally composed of high melting metals, such as molybdenum, tungsten, etc. or are composed of ceramics or quartz or even carbon. Heretofore no generally acceptable means of joining carbon bodies to such other bodies has been available.

Accordingly, it is an important object of the present invention to provide brazing compositions and methods of utilizing the same that overcome the aforesaid drawbacks.

It is another object of the present invention to provide brazing compositions and methods of utilizing the same to form a vacuum-tight bond between carbon bodies and bodies of temperature-resistant materials.

It is yet another object of the present invention to provide brazing compositions covering a relatively large temperature range and methods of utilizing the same.

It is a further object of the present invention to provide brazing compositions and methods of utilizing the same to form support bases on bodies having a highly diversified thermal coefficient of expansion suitable for conventional brazing filler metals.

It is yet a further object of the present invention to provide brazing compositions of metal-borides, eutectic metal boride systems and mixtures thereof and methods of utilizing the same.

These and other objects, features and advantages of the present invention will become more apparent with the teachings of the principles of the invention in connection with the disclosure of the preferred embodiments thereof in the sperification and claims.

The invention provides novel brazing compositions and methods of utilizing the same for a brazing or connection having substantially universal applicability. By a relatively simple variation of the materials comprising the brazing compositions of the invention a relatively large temperature spectrum or range is covered. The brazing compositions of the invention thus readily lend themselves to multiple brazing operations where varying brazing temperatures are utilized one after the other. The brazing compositions of the invention exhibit no detrimental influence, not even at increased temperatures, on the bonding operating procedure and, for example, at relatively high temperatures the compositions of the invention exhibit very low vapor pressures in comparison with conventional brazing filler metals.

In accordance with the principles of the instant invention, the brazing compositions form an intimate adherent bond, and preferably vacuum-tight bond or connection between carbon bodies and bodies composed of other temperature-resistant materials. Preferably, this is achieved by providing the brazing composition of the invention in a liquid phase and applying the liquid phase directly on the surface to be bonded, connected or joined and heating the brazing composition for a relatively short period of time at a temperature slightly above the melding or liquids point of such brazing composition in a non-oxidizing atmosphere, such as an inert or reducing atmosphere or in a vacuum. Generally, the brazing composition of the invention consists essentially of materials selected from the group consisting of a metal-boride, a eutectic metal-boride system and mixtures thereof.

The temperature-resistant materials to which the intimate, vacuum-tight bonds, joints, or connections can be formed with carbon bodies by the use of the brazing composition of the instant invention are selected from the group consisting of metals, ceramics, quartz, carbon and mixtures thereof. As will be apparent, these temperature-resistant materials have highly diversified thermal coefficient of expansion and are used in various combinations in, among other areas, the construction of components of electronic tubes. Nevertheless, such materials may be joined or bonded together by the brazing composition of the invention. The brazing compositions of the invention form intimate vacuum-tight bonds between bodies of such materials and carbon bodies thereby allowing carbon bodies to be utilized in the construction of such tubes and allow the realization of all the advantages of having carbon parts in electronic tubes.

The meltings of metal-boride and/or eutectic meltings of a metal-boride system (i.e. a liquid phase) can be used directly for the formation of vacuum-tight joints or connections between various high melting metals, such as molybdenum, tungsten, rhenium, etc., and/or other temperature-resistant materials such as carbon, quartz or ceramics. As will be appreciated, ceramic bodies may be provided with metallized surfaces to aid the brazing procedure as desired. The metal-boride is generally selected from the group consisting of boride of Ni, Fe, Co, V, Cr, Mo, Nb, Ta, Zr, Pd, Pt and mixtures thereof. Preferably the metal-boride is selected from the group consisting of Ni, Fe, Co, and mixtures thereof. The metal-borides and/or eutectic metal-boride systems of the invention are also intermixable with metal carbides, such as molybdenum carbide.

The brazing compositions (which include metal-borides per se, eutectic metal-boride systems per se, mixtures thereof per se and mixtures thereof with metal carbides) tend to moisten and adhere, in accordance with their chemical nature, to the surfaces of the carbon bodies and the surfaces of the other temperature-resistant bodies that are to be bonded together. Various bodies composed of temperature-resistant materials (set forth hereinabove) can be bonded together in a vacuum-tight bond by providing a liquid-like layer or covering on the surfaces to be connected of a metal-boride (or eutectic system thereof) or a mixture of such metal-boride and metal carbide and heating the same for a relatively short period of time just barely above the melting point of the metal-boride or of the formed liquid phase (from the eutectic metal-boride system) in a vacuum or in a non-oxidizing atmosphere, such as an inert or a reducing atmosphere. As indicated hereinbefore, the liquid phase may be achieved by merely melting the metal-boride and/or eutectic metal-boride system or such metal-boride or eutectic metal-boride system may be suspended in an organic suspension and applied by spraying or immersion or the like of the surfaces to be bonded together. In addition, the metal-boride and/or eutectic metal-boride system may be applied through chemically reductive deposition onto the surfaces of the bodies to be connected.

The following table sets forth the melting points of certain preferred metal-borides utilized in the invention:

TABLE I

| Metal-boride: | Melting point, ° C. |
| --- | --- |
| $Ni_2B$ | 1125 |
| $Ni_3B$ | 1160 |
| $Co_2B$ | 1280 |
| $Fe_2B$ | 1389 |
| $Mo_2B$ | 1850 |

Thus for example, at a temperature range of 1150° to 1250° C., a body component composed of carbon particles per se, can be combined with a component composed of a metal, such as molybdenum, or a ceramic having a metallized surface by utilizing nickel boride to braze or bond such components together in accordance with the principles of the invention. Alternatively, instead of utilizing nickel boride per se as the brazing composition, it is also possible to utilize a mixture of nickel boride and a metal carbide, such as molybdenum carbide. Preferably, the metal carbide is utilized in amounts ranging from 0.5 to 3 times the weight of the nickel boride (or other selected brazing composition material). Addition of the metal carbide (preferably molybdenum carbide) in the range set forth does not increase the melting point of the mixture much above that of pure boride (i.e. 1200° to 1250° C.) but greatly enhances the wetting characteristics of such a mixture and thus provides a more intimate bond at the joint.

By relatively simple selection of an appropriate metal-boride and/or of the components of an appropriate metal-boride metal-carbide mixture, a wide range of brazing temperatures can be achieved. Thus, the temperature necessary to achieve the adhesive or bonding combination is given on one hand and the temperature limit for the brazing process is given on the other hand. This temperature limit cannot be exceeded in order to preserve the adhesive or adherent condition of the formed bond, connection or joint.

A yet further embodiment of the invention consists of utilizing a mixture of relatively fine powder particles of elemental boron and elemental metal as the material of the brazing composition in accordance with the principles set forth hereinabove. The brazing composition of such a powder mixture are generally in stoichiometric proportions so that the brazing compositions combine to form joints or connections between various bodies substantially similar to those achieved by utilizing the corresponding metal-boride compounds. However, preferably, the quantity of boride in such a powder mixture is less than the stoichiometric amount required. A powder mixture utilizing less than the stoichiometrically required amount of boride provides a eutectic system having considerably different and generally lower melting points than a mixture having stoichiometric amounts of boride. This embodiment of the invention provides yet a further means of simply varying the brazing temperature as desired.

The following table set forth the melting points of certain preferred mixtures utilized in the invention:

TABLE II

| Component share: | Melting point, ° C. |
| --- | --- |
| 81.6 At [1] % Ni and 18.4 At % B (approx.=4 weight % of B) | 1080 |
| 81.5 At % Co and 18.5 At % B (approx.=4 weight % of B) | 1095 |
| 87 At % Cr and 13 At % B (approx.=3 weight % of B) | 1580 |
| 80 At % Ta and 20 At % B (approx.=1.5 weight % of B) | 1780 |
| 85 At % V and 15 At % B (approx.=3.5 weight % of B) | 1550 |
| 88 At % Zr and 22 At % B (approx.=3.5 weight % of B) | 1760 |
| 86 At % Nb and 14 At % B (approx.=2 weight % of B) | 1600 |
| 73 At % Pd and 27 At % B (approx.=3.6 weight % of B) | 845 |
| 60 At % Pt and 40 At % B (approx.=3.6 weight % of B) | 830 |

[1] Atomic weight.

While in the individual brazing methods set forth hereinabove the brazing compositions consisted substantially of various metal-boride systems wherein the liquid phase thereof actually formed the brazing medium per se, in situations where it is necessary to bond bodies having highly diversified thermal coefficient of expansion, the brazing compositions of the instant invention are utilized to wet one or both of the surfaces to be connected and to produce a brazable support base. In these situations, generally a conventional brazing filler metals, for example an Au–Ag eutectic system is used as the actual bonding material. In joining materials having an extremely divergent thermal coefficient of expansion a copper foil or the like is preferably interposed between the surfaces to be joined and thereafter the surfaces are wet with the brazing compositions of the instant invention substantially as indicated above and a suitable brazing filler metals is applied thereover.

The methods and materials of the instant invention provide a substantial advantage wherein by simple variations of the starting materials a very large temperature spectrum is covered. Further, the brazing materials of the invention consisting essentially of borides have a very low vapor pressure under vacuum conditions and thereby further lend themselves to application in electron tube construction.

As will be appreciated, the methods and materials described are not limited to forming bonded joints with only carbon bodies but also include forming bonded joints between two metal parts and/or ceramic or quartz parts and also joints between metal and ceramic and/or quartz parts.

The present invention will now be described in somewhat greater detail by reference to the following examples, which are only to be construed as being illustrative and not limiting in any way.

Example I

Two carbon bodies were brazed together in accordance with the principles of the present invention by applying a substantially uniform coat of liquid phase nickel boride, having a thickness of about 10 to 20 μm. The two bodies were joined at their coated areas and annealed and/or brazed for 5 to 15 minutes at temperatures of 1200° to 1250° C. in a dry reducing fission gas atmosphere (being about 75% by volume of $H_2$ and about 25% by volume $N_2$). Upon cooling, the resultant joint was firm and vacuum-tight.

Example II

A carbon body and a metal body were brazed together by applying a mixture consisting of 95% by weight elemental Ni particles and 4% by weight B particles, in a substantially uniform coating (about 10 to 20 μm. thick) onto the surfaces that were to be joined. The surface were then subjected to the annealing and/or brazing treatment described in conjunction with Example I, at temperatures of 1150° to 1200° C.

Example III

Two carbon bodies were jointed to one another by applying a substantially uniform coating thereon of a mixture consisting of 1 part by weight of finely pulverized nickel boride and 2 parts by weight of $Mo_2C$ onto the areas that were to be brazed together. The surfaces were then subjected to the annealing and/or brazed treatment described in conjunction with Example I, at temperatures of 1230° to 1280° C. The so-formed joint had adequate strength and was vacuum-tight.

Example IV

A ceramic body was metallized by a conventional molybdenum-manganese-silicate process and uniformly coated (by electro-deposition) with a nickel layer of about 5 μm. A carbon body was then coated with a mixture of nickel-boride and molybdenum-carbide substantially as described in conjunction with Example III. The coated bodies were then separately annealed as hereinbefore described. Then a 30 μm. thick copper foil was placed between the two pretreated bodies to neutralize the different coefficients of thermal expansion and a conventional Au-Ag brazing filler metal was applied at temperature of 800° to 850° C. in a vacuum and/or in an inert atmosphere substantially as described hereinbefore.

As will be appreciated the other embodiments of the invention described hereinbefore may also be practiced in a like manner.

It will be understood that modifications and variations may be effected without departing from the scope and spirit of the novel concepts of the present invention.

I claim as my invention:

1. A method of producing an intimate vacuum type bond between a carbon body and a body composed of a temperature-resistant material adapted for bonding to carbon bodies and selected from the group consisting of metal, carbon, ceramic, quartz and mixtures thereof; consisting essentially of the steps of (1) providing a liquid phase of a brazing composition consisting essentially of a mixture of molybdenum carbide and a metal boride selected from the group consisting essentially of borides of Co, Fe, Ni and mixtures thereof, the amount of molybdenum carbide present in said mixture ranging from about 0.5 to 3 times the weight of the metal boride present in said mixture; (2) directly applying said liquid phase to the body surfaces being bonded at the area of the bond, and (3) heating said brazing composition for a relatively short period of time to a temperature above the melting point of said composition in a non-oxidizing atmosphere.

2. A method as defined in claim 1 wherein the metal boride is a cobalt boride.

3. A method as defined in claim 1 wherein the metal boride is a nickel boride.

4. A method as defined in claim 1 wherein the metal boride at step (1) is composed of elemental boron and elemental metal, which during the heating step (3) forms a relatively low melting eutectic of the corresponding boride.

5. A method as defined in claim 4 wherein the ratio of elemental boron to elemental metals is less than stoichiometrically required for formation of the corresponding metal boride.

6. A method as defined in claim 1 wherein the brazing composition provides a base on the surfaces of the bodies to be connected for supporting a brazing filler metal having a relatively low melting point relative to said brazing composition.

7. A method as defined in claim 6 wherein a copper foil is interposed between the surfaces of the bodies being connected for supporting the brazing filler metal having a relatively low melting point relative to said brazing composition.

8. The method as defined in claim 1, wherein the step of applying a liquid phase of the brazing composition to the surfaces of the bodies to be connected includes forming an organic suspension containing the brazing composition and applying a layer thereof on said surfaces at the point of connection.

9. The method as defined in claim 8, wherein the organic suspension containing the brazing composition is sprayed on the surface of the bodies to be connected.

10. The method as defined in claim 9, wherein the surfaces of the bodies to be connected are immersed in a bath of the organic suspension containing the brazing composition.

11. The method as defined in claim 1, wherein the step of applying the liquid phase of the brazing composition includes chemically-reductive deposition of the brazing composition onto the surfaces of the bodies to be connected.

References Cited

UNITED STATES PATENTS

| | | | |
|---|---|---|---|
| 3,073,269 | 1/1963 | Hoppin | 29—501 X |
| 3,152,871 | 10/1964 | Matchen | 29—473.1 X |
| 3,373,483 | 3/1968 | Miller | 29—501 |

FOREIGN PATENTS 754,499   8/1956   Great Britain.

JOHN F. CAMPBELL, Primary Examiner

R. J. SHORE, Assistant Examiner

U.S. Cl. X.R.

29—504